US011993151B2

(12) United States Patent
Köpfler et al.

(10) Patent No.: US 11,993,151 B2
(45) Date of Patent: May 28, 2024

(54) HYBRID POWERTRAIN AND ASSEMBLY METHOD FOR A HYBRID POWERTRAIN

(71) Applicant: Schaeffler Technologies AG & Co. KG, Herzogenaurach (DE)

(72) Inventors: Sebastian Köpfler, Bühl (DE); Bernhard Walter, Oberkirch-Haslach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 489 days.

(21) Appl. No.: 17/284,564

(22) PCT Filed: Oct. 14, 2019

(86) PCT No.: PCT/DE2019/100888
§ 371 (c)(1),
(2) Date: Apr. 12, 2021

(87) PCT Pub. No.: WO2020/094178
PCT Pub. Date: May 14, 2020

(65) Prior Publication Data
US 2021/0331577 A1   Oct. 28, 2021

(30) Foreign Application Priority Data

Nov. 6, 2018 (DE) .......................... 102018127639.7

(51) Int. Cl.
*B60K 6/543* (2007.10)
*B60K 6/365* (2007.10)
(Continued)

(52) U.S. Cl.
CPC ............. *B60K 6/442* (2013.01); *B60K 6/365* (2013.01); *B60K 6/387* (2013.01); *B60K 6/40* (2013.01);
(Continued)

(58) Field of Classification Search
CPC ........ F16H 9/18; F16H 37/065; F16H 37/022; F16H 2057/005; F16H 57/021;
(Continued)

(56) References Cited

U.S. PATENT DOCUMENTS

| 3,744,760 A * | 7/1973 | Uher ........................ B66D 1/16 254/351 |
| 2002/0117860 A1 | 8/2002 | Man et al. |

(Continued)

FOREIGN PATENT DOCUMENTS

| DE | 19941705 A1 | 3/2000 |
| DE | 112010003111 T5 | 10/2012 |

(Continued)

*Primary Examiner* — Roger L Pang (57) ABSTRACT

A hybrid powertrain includes an output shaft, a combustion power section for providing a first torque, an electric power section for providing a second torque, and an output transmission for transmitting the first torque between the combustion power section and the output shaft and transmitting the second torque between the electric power section and the output shaft. The combustion power section includes an internal combustion engine with a combustion shaft for outputting the first torque, a generator with a generator shaft for converting the first torque into electric energy, and a variable belt transmission for variably translating the first torque. The belt transmission includes a combustion-side cone pulley pair with a first axially movable pulley arranged on a generator shaft side, an output-side cone pulley pair with a second axially movable pulley, and a belt for variably torque-transmittingly connecting the combustion-side cone pulley pair to the output-side cone pulley pair.

19 Claims, 3 Drawing Sheets

(51) Int. Cl.
*B60K 6/387* (2007.10)
*B60K 6/40* (2007.10)
*B60K 6/442* (2007.10)
*F16H 9/18* (2006.01)
*F16H 37/02* (2006.01)
*F16H 37/06* (2006.01)
*F16H 57/021* (2012.01)
*F16H 57/00* (2012.01)

(52) U.S. Cl.
CPC ............ B60K 6/543 (2013.01); F16H 9/18 (2013.01); F16H 37/022 (2013.01); F16H 37/065 (2013.01); F16H 57/021 (2013.01); B60Y 2200/92 (2013.01); F16H 2057/005 (2013.01)

(58) Field of Classification Search
CPC .......... B60K 6/442; B60K 6/387; B60K 6/40; B60K 6/543; B60K 6/365; B60Y 2200/92
USPC .............. 475/210, 5; 180/65.225, 65.23; 74/606 R
See application file for complete search history.

(56) References Cited

U.S. PATENT DOCUMENTS

| | | | |
|---|---|---|---|
| 2006/0247086 A1* | 11/2006 | Watanabe | B60K 6/387 475/5 |
| 2007/0084649 A1 | 4/2007 | Abe et al. | |
| 2012/0122629 A1 | 5/2012 | Akutsu et al. | |
| 2012/0309569 A1* | 12/2012 | Faes | F16H 55/56 474/46 |
| 2017/0282904 A1* | 10/2017 | Morita | B60K 6/387 |
| 2021/0138889 A1* | 5/2021 | Köpfler | B60K 6/48 |

FOREIGN PATENT DOCUMENTS

| | | |
|---|---|---|
| EP | 1657100 A1 | 5/2006 |
| EP | 3124830 A1 | 2/2017 |

\* cited by examiner

HYBRID POWERTRAIN AND ASSEMBLY METHOD FOR A HYBRID POWERTRAIN

CROSS-REFERENCE TO RELATED APPLICATIONS

This application is the United States National Phase of PCT Appln. No. PCT/DE2019/100888 filed Oct. 14, 2019, which claims priority to German Application No. DE102018127639.7 filed Nov. 6, 2018, the entire disclosures of which are incorporated by reference herein.

TECHNICAL FIELD

The disclosure relates to a hybrid powertrain with a combustion power section and with an electric power section, both power sections being designed to provide a torque to an output shaft as required. The hybrid powertrain additionally includes an output transmission torque-transmittingly connected to the output shaft and the electric power section includes an electric machine with a rotor shaft. The combustion power section includes an internal combustion engine with a combustion shaft, a generator with a generator shaft, and a continuously variable belt transmission. The continuously variable belt transmission includes a combustion-side cone pulley pair and an output-side cone pulley pair which are variably torque-transmittingly connected together by a belt, and each of which includes an axially movable pulley. The combustion-side movable pulley is arranged on the generator shaft side. The disclosure additionally relates to an assembly method for a hybrid powertrain.

BACKGROUND

In the prior art, at least the generator is arranged as an extension to the internal combustion engine. The generator is then coupled to the internal combustion engine via a direct connection or via a single gear stage. In many applications, it is problematic that the installation space in an engine compartment is limited because, for example, this has a conventional design and is therefore sufficient for only one conventional internal combustion engine and one alternator (generator alone for engine torque absorption). Therefore, complex measures must be taken to reduce the space required for the units.

SUMMARY

In the following, reference will be made to the combustion axis, i.e., the (theoretical) axis of the torque output of the internal combustion engine if the axial direction, radial direction or the circumferential direction and corresponding terms are used unless explicitly stated otherwise. This is explicitly stated when referring to a transmission axis or another axis.

If one side is designated, for example a combustion-side arrangement of a component, this is related to the torque flow, and the description is based on the output of torque from the internal combustion engine, the generator and the electric machine to the output transmission, although optionally or permanently a reverse torque flow is also possible.

In the following, the input side and output side, for example of the belt transmission, are referred to. In a simple embodiment, these are an input shaft or an output shaft. Alternatively, such a side includes a translation stage and/or a radially offset stage. A stage generally designates a (simple) transmission or a transmission component. The terms input and output refer to a torque flow according to the previous definition and do not exclude a reversed torque flow, i.e., from the output side to the input side.

Unless explicitly stated otherwise, ordinal numbers used in the previous and subsequent descriptions are used only for the purposes of clear distinction and do not indicate the order or ranking of the designated components. An ordinal number greater than one does not necessarily mean that another such component must be present.

If a reduction is used in the following, this means a translation ratio of less than 1. If, on the other hand, translation is referred to, this is not limited to a translation ratio greater than 1, unless explicitly stated or mentioned as the opposite of the reduction. The translation ratio is always related to the speed.

A multiplicity of gears is mentioned below. These are designed, for example, as gear wheels meshing with another gear wheel or as a gear of a traction drive, e.g., as a gear wheel of a chain drive. Bearings are also referred to which are designated differently according to their position and/or function, and the different designation primarily serves to better distinguish them. Such a bearing is designed for mechanical support against transverse loads, and (also) designed as a fixed bearing or as an axial bearing (only) against axial loads. The mounted shaft can thus be rotated about its respective axis with little friction. Plain bearings or roller bearings are used, for example ball bearings, cylinder bearings or needle roller bearings. The term bearing refers to a bearing arrangement, for example consisting of a floating bearing and a fixed bearing.

The disclosure relates to a hybrid powertrain with a combustion power section and with an electric power section, both power sections being designed to provide a torque to an output shaft as required. The hybrid powertrain additionally includes an output transmission torque-transmittingly connected to the output shaft for transmitting a torque between the output shaft and the combustion power section and between the output shaft and the electric power section.

The electric power section includes an electric machine with a rotor shaft for outputting a torque. The combustion power section includes an internal combustion engine with a combustion shaft for outputting a torque, a generator with a generator shaft for converting a torque into electric energy, and a variable belt transmission which is configured to variably translate a torque of the combustion shaft. The belt transmission includes a combustion-side cone pulley pair and an output-side cone pulley pair which are variably torque-transmittingly connected together by a belt and each of which includes an axially movable pulley for changing the transmission ratio. The movable pulleys of the cone pulley pairs are arranged axially opposite one another. The combustion-side movable pulley is arranged on the generator shaft side.

The structure of the hybrid powertrain proposed here has only one toothed chain stage or one spur gear stage in the extension to the combustion engine, and, after a torsional vibration damper, for example, a dual-mass flywheel and/or a centrifugal pendulum (strictly speaking a torsional vibration mass damper, but understood here, as widely used in the prior art, under the collective term torsional vibration damper). The rest of the transmission is arranged on the side of the internal combustion engine (combustion) to the rear, i.e., parallel to the combustion axis of the combustion.

The hybrid powertrain is configured to convert the available energy into propulsion and/or torque output for as long as possible, subject to the lowest possible carbon dioxide emissions of the internal combustion engine. For this purpose, a comparatively large battery is usually provided, which stores electric energy. If possible, the battery should be charged plugged into an external energy source, as a plug-in hybrid. This purely electric operation (switching state 1: electric machine or the electric power section and/or the motor generators of the combustion power section is the only drive), is expected to result in an overall more efficient (electric) energy generator, such as conventional large power plants and generators of so-called renewable (electric) energy, reduced carbon dioxide emissions, and reduced emissions of hazardous substances, such as nitrogen oxides and fine dust, above all in the direct environment of large gatherings of people.

The internal combustion engine should only be put into operation when the battery is in a low state of charge or when the operating state is optimal for the internal combustion engine (for example, overland travel at constant driving speed) (switching state 2: internal combustion engine or the combustion power section as a drive without an electric machine). Alternatively, the internal combustion engine is switched to support a constant charge (switching state 3: electric machine and internal combustion engine form the drive).

According to a further aspect, in order to achieve a high torque, only the internal combustion engine (corresponding to switching state 3) or only the generator, e.g., as a so-called motor generator, is suitable as an electric machine for torque output (switching state 4a: purely electric boosting or purely electric driving) or the (motor) generator and the internal combustion engine (switching state 4b: overall system boosting or overall system driving) are switched to boost the torque output or to increase the torque output of the electric machine of the electric power section for a longer period of time. Furthermore, if the battery is in a low state of charge, electric energy is to be generated as a precaution or for direct consumption by means of the internal combustion engine and the generator. In one case (switching state 5a: charging without combustion-side input power) the output is still driven solely by the electric machine or the output does not absorb any torque. In another case, torque is additionally output from the internal combustion engine to the output (switching state 5b: charging with auxiliary drive power from the combustion side).

The internal combustion engine may be a piston engine with a crankshaft as the combustion shaft. The combustion shaft may include a torsional vibration damper, for example a dual-mass flywheel and/or a centrifugal pendulum, in order to decouple torque vibrations superimposed on the torque output with high efficiency from the rest of the powertrain. Such a torsional vibration damper may be arranged in the torque flow upstream of the belt transmission.

A starter generator, in contrast to a (pure) alternator, is configured to output a torque. A starter generator is designed to start an internal combustion engine in an automatic start-stop system, partly also for cold-starting the internal combustion engine and partly for boosting the torque of the internal combustion engine. A starter generator is by definition a subset of a motor generator. However, a motor generator can also be configured to output a torque to the output in a much more powerful way.

As can be seen from the above description, the generator is configured to absorb a torque via its generator shaft and convert it into electric energy. In an example embodiment, the (motor) generator can be connected according to switching state 4b via its generator shaft to the output for torque delivery in a torque-transmitting manner. Furthermore, the generator and/or the electric machine of the electric power section can be connected in a torque-transmitting manner for torque absorption so that the inertial energy of the output or of a moving motor vehicle is converted into electric energy when decelerating and fed into an battery (switching state 6: recuperation, i.e., electric braking with electric energy recovery via the adjustable magnetic resistance in the generator or the electric machine of the electric power section). The internal combustion engine may be decoupled from the output. Alternatively or additionally, the generator is electrically connected directly to the electric machine via an inverter so that electric energy generated on the generator is made available directly for use in the electric machine.

The electric machine of the electric power section is optimized for delivering the highest possible torque with the most efficient consumption possible, and may be configured for torque absorption, i.e., recuperation. In a high-torque electric machine, the rotor shaft may be permanently connected to the output without a separating clutch. The electric machine is then connected in such a way that it outputs a torque at the output with every reduction in power. In the case of an internal combustion engine with high torque compared to the electric machine, an additional separating clutch or a freewheel may be provided between the rotor shaft and the output.

While a required speed range and torque range can often be covered by means of electric machines without variable translation, the speed range is limited in a usable torque range of an internal combustion engine in such a way that a variable translation is necessary. For this purpose, a variable belt transmission is provided in the combustion power section. In the following, the variable belt transmission will be referred to as just a belt transmission for short. This belt transmission is configured to translate a torque of the combustion shaft in a variable manner. Such a belt transmission is, for example, a so-called CVT (continuous variable transmission), a sliding chain drive as a steplessly switchable, i.e., continuously variable, step-up transmission or other known or yet to be developed belt transmission. The ratio may be changed using an automatic system because there is often no connection between the speed of the motor vehicle and the engine speed. The input side of the belt transmission is the side for absorbing torque from the internal combustion engine and the output side of the belt transmission is the side for outputting torque to the output, i.e., the output transmission or the at least one output shaft. This by no means excludes that a torque may run in the opposite direction, for example for recuperation from the output to the generator.

A belt transmission is configured to always deliver a torque on the input side at the desired speed to the output side, or vice versa. The translation ratio can be adjusted continuously and without an additional manual transmission, for example. In addition, a torque of the output and/or the generator shaft can always be delivered to the internal combustion engine at the desired speed via the belt transmission. The internal combustion engine can thus be operated at an optimal charge point over wide ranges of the required speed at the output, e.g., over the entire required speed range. The pollutant emissions of the internal combustion engine can thus be reduced further. The efficiency of a belt transmission can now be brought close to the efficiency of a single-stage spur gear so that these losses in efficiency are low compared to a non-optimal operation of the internal combustion engine.

A belt transmission has two cone pulley pairs, which are torque-transmittingly connected together by means of a rotating belt. Each cone pulley pair has a rigid conical pulley, also referred to as a fixed pulley, and a corresponding axially movable pulley, also referred to as a floating pulley. If the movable pulley is moved towards the fixed pulley, the circumferential radius of the belt increases as a result of the reduction in the distance between the two conical pulleys of the cone pulley pair. The circumferential radius is also reduced when the movable pulley moves away from the fixed pulley. These movements of the movable pulleys of the two cone pulley pairs of a belt transmission are usually synchronized with one another in such a way that no additional tensioning device has to be provided to maintain a desired tension, i.e., the belt length is kept (almost) constant. So that the belt does not move axially (too much), the two movable pulleys of the belt transmission are arranged opposite one another.

The movable pulleys are axially driven by means of a hydrostatic pressure cylinder, in which the movable pulleys themselves may form the pressure piston. The pressure fluid is often fed through a shaft bore in the transmission shafts of the belt transmission. For the simplest possible supply and structural arrangement, it has so far been considered advantageous in the prior art to arrange the movable pulley on the side of the belt transmission facing away from the generator and thus easily accessible for the fitter.

In the present case, only a small translation spread is required, which results in a small conical pulley diameter. However, the actuation force is proportional to the (maximum) transmittable torque. In order to keep the pressure for actuating the movable pulley at a desired low level, it is provided here that, together with the (large) pressure piston, it has a significantly larger diameter than the rigid conical pulley.

In one embodiment, the receiving shaft of the output transmission has a single (receiving) spur gear, and no intermediate gear may be provided between the rotor shaft and the receiving spur gear. Such an intermediate gear in known solutions merely forms an intermediate gear for maintaining a required center distance between the electric machine of the electric power section and the reduction gearing or differential. Thus, such an intermediate gear is used for purely structural considerations and only reduces the efficiency of the electric power section.

In this case, a hybrid powertrain with a structure has been found in which the required radial installation space of the combustion power section is reduced in such a way that an electric-side intermediate gear wheel can be dispensed with. For this purpose, the combustion-side movable pulley of the belt transmission is arranged on the (second) input side of the generator, from which it follows that the output-side movable pulley is arranged opposite. The output-side movable pulley faces the electric power section. Because the movable pulley with its hydrostatic pressure cylinder (actuator) is the radially largest component of the output-side portion of the belt transmission, the installation space of the electric power section is adversely affected by the output-side movable pulley or its actuating cylinder. Due to the axial arrangement of the output-side movable pulley opposite the combustion-side movable pulley and opposite the generator of the combustion power section, radial installation space is made available to the receiving gears of the output transmission.

Because the electric machine of the electric power section generally has a very different speed to the shaft on the combustion side for torque output at the output, a separate gear has been provided for the electric machine. The combustion-side shaft for torque output at the output is hereinafter referred to as the output shaft.

Here, however, it is now proposed to dispense with a separate transmission on the electric side. Instead, the reduction gearing has a direct combustion input stage for the combustion power section and a direct electric input stage for the electric power section. A stage referred to as a direct (reduction) stage is a device for single-stage torque transmission.

In one embodiment, for example, no further gear wheels are provided between the output shaft of the internal combustion power section and the output transmission, and/or no further gear wheel between the rotor shaft of the electric machine and the output transmission. Rather, the output transmission has a single receiving shaft, for example with a spur gear for the output shaft and a spur gear for the rotor shaft, so that both the combustion power section and the electric power section have a direct torque-transmitting effect on the (common) receiving shaft of the output transmission.

In one embodiment, the rotor shaft acts, e.g., with a rotor wheel or electric output gear, directly on a separate (first receiving) spur gear of the receiving shaft of the output transmission and the output shaft on another (second receiving) spur gear of the receiving shaft of the output transmission.

In addition to the belt transmission and a speed-fixed combustion stage, and optionally a speed-fixed generator stage, the combustion power section may have no further transmission changing the speed of the combustion shaft of the internal combustion engine or the generator shaft of the generator.

According to one aspect, it is optionally proposed that the belt transmission can be connected to the combustion shaft in a torque-proof manner so that a continuously changeable torque is transmitted to the output shaft of the combustion power section. There is no switchable slipping torque clutch, for example a friction clutch. This means that additional axial installation space is gained in the combustion power section. Alternatively, a slipping clutch is provided which replaces a conventional switchable friction clutch and requires a significantly reduced axial installation space.

By reducing the stages or integrating the stages into the (common) reduction transmission of both power sections, an increased efficiency can be achieved compared to a conventional arrangement.

The generator may be arranged parallel to the internal combustion engine, e.g., connected to the generator shaft directly or via a fixed-speed, e.g., single-stage, generator transmission to the input shaft of the belt transmission. Thus, on the input side, i.e., on the combustion side, the belt transmission is connected downstream of both the generator shaft and the combustion shaft of the internal combustion engine. The generator and the internal combustion engine are thus connected together in a fixed-speed, torque-transmitting manner.

An embodiment of the hybrid powertrain is also proposed in which the combustion shaft of the internal combustion engine and the generator shaft of the generator point in the same axial direction, and wherein the combustion shaft is torque-transmittingly connected to a first input side of the combustion-side cone pulley pair by means of a rigid combustion transmission, and the generator shaft is torque-transmittingly connected axially opposite to a second input side of the combustion-side cone pulley pair.

The combustion-side cone pulley pair therefore has a first input side, for example a continuous first input shaft, and a second input side, for example a continuous second input shaft. In a viewing direction in which the combustion axis extends from left to right, the main portion of the axial extent of the internal combustion engine and the (entire) generator are arranged to the left of the combustion-side cone pulley pair, the first input side is arranged on the right and the second input side is arranged on the left. The first input side can therefore also be designated as axial on the combustion side and the second input side therefore also be designated as axial on the generator side. The cone pulley pair on the combustion side is thus arranged axially between the generator and the combustion transmission of the internal combustion engine, for example a spur gear or a traction drive, for example a chain drive.

The combustion shaft of the internal combustion engine and the generator shaft of the generator point in the same axial direction, i.e., from the left (respective engine block side) to the right (respective output shaft side) in the above-mentioned viewing direction.

The combustion shaft is torque-transmittingly connected to the first input side of the combustion-side cone pulley pair by means of a rigid combustion transmission. The internal combustion transmission thus bridges a structurally necessary axial distance between the internal combustion axis and the generator axis, i.e., the center of rotation of the generator shaft. In addition, the combustion transmission provides a desired translation of the engine speed as the input speed for the combustion-side cone pulley pair. A transmission ratio of 1 is usually desired and set. The combustion transmission is also referred to as the primary stage.

For some applications, the axial installation space for the internal combustion engine, whether installed transversely or longitudinally to the direction of travel of the motor vehicle, is already exhausted by the axial overall length of the internal combustion engine. It is particularly advantageous here to arrange a large part of the units of the hybrid powertrain in parallel and/or axially overlapping the internal combustion engine. To date, it has been believed that it is generally more advantageous if an offset of the torque-transmitting shaft towards the output is taken over by the variable transmission. However, it has been found that the installation space next to the internal combustion engine in particular offers sufficient installation space when cleverly nested because the internal combustion engine does not have the shape of a cuboid, but in part (also as an in-line engine) a V-shape and recesses.

The generator shaft is torque-transmittingly connected axially opposite the combustion transmission to the second input side of the combustion-side cone pulley pair. As a rule, the belt transmission is axially significantly shorter than the internal combustion engine and can therefore, as is proposed here, be arranged in axial overlap with the internal combustion engine. In this embodiment of the hybrid powertrain, the belt transmission of the internal combustion power section is thus arranged offset parallel to and/or in an axial overlap with the internal combustion engine.

In a hybrid powertrain in an alternative or additional embodiment, only the combustion transmission is provided in the axial extension of the combustion shaft for torque transmission to the output by means of the belt transmission, e.g., designed as a single-stage spur gear transmission that is rigid in terms of speed. A torsional vibration damper may also be arranged between the internal combustion engine and the combustion transmission so that torsional vibrations of the combustion shaft are decoupled from the torque curve of the combustion power section at an early stage. Such a torsional vibration damper includes, for example, a dual-mass flywheel and/or a centrifugal pendulum. The axial installation space required in the extension of the internal combustion engine is thus small.

An embodiment of the hybrid powertrain is proposed, in which the belt transmission and/or the generator of the combustion power section are arranged offset parallel to and/or in an axial overlap with the internal combustion engine.

In one of the mentioned embodiments of the hybrid powertrain, the belt transmission is offset parallel to, but not in an axial overlap with, the internal combustion engine. In one of the mentioned embodiments of the hybrid powertrain, the generator is offset parallel to, but not in an axial overlap with, the internal combustion engine.

In one of the mentioned embodiments of the hybrid powertrain, the belt transmission is arranged in an axial overlap with and offset from the internal combustion engine, but not in parallel. In one of the mentioned embodiments of the hybrid powertrain, the generator is arranged in an axial overlap with and offset to the internal combustion engine, but not in parallel.

In one of the mentioned embodiments of the hybrid powertrain, the belt transmission is arranged offset parallel to and/or in an axial overlap with the internal combustion engine, but the generator is not offset parallel to and/or not in an axial overlap with the internal combustion engine. In one of the mentioned embodiments of the hybrid powertrain, the previous sentence applies in reverse with regard to the belt transmission and the generator.

In an example embodiment with regard to the axial installation space, the belt transmission and the generator of the combustion power section are arranged offset parallel to and in an axial overlap with the internal combustion engine. The generator may be brought into an axial overlap with the internal combustion engine over its entire axial extent.

As a rule, the generator is axially shorter than the internal combustion engine and can therefore, as is proposed here, be arranged together with the belt transmission arranged in an axial extension of the generator axis in an axial overlap with the internal combustion engine.

An embodiment of the hybrid powertrain is proposed, in which a first separating clutch is provided between the combustion shaft of the internal combustion engine and the belt transmission for the switchable disconnection of a torque transmission between the output shaft and the internal combustion engine.

In this embodiment, a separating clutch, i.e., a releasable torque transmission clutch, is provided between the belt transmission and the internal combustion engine. The generator may be inseparably connected to the belt transmission and thus permanently connected to transmit torque. In one embodiment, the belt transmission and the generator run permanently with the output, and, for example, the electric voltage on the generator is regulated to (almost) zero for cruising, so that only the rotating mass of the belt transmission and the generator shaft contribute to the mechanical losses.

The speed of the generator can be freely adjusted and the speed of the combustion shaft of the internal combustion engine can be adjusted relatively precisely, at least after starting. As a result, the relative speed can be regulated to zero, or at least brought close enough to zero so that such a separating clutch can be switched in (almost) any state. A friction clutch, in which a slip at high relative speeds is permissible, is therefore not necessary. The separating clutch is therefore, for example, a claw clutch or a so-called wedge clutch. A wedge clutch has a hub cone and a (rounded) polygonal driver cone, e.g., with a corresponding receiving cone designed as a solid spring. With such a wedge clutch, it is possible to switch between relative speeds of 20 rpm [revolutions per minute] to 30 rpm, because the engagement is not purely form-fitting, but rather force-fitting.

According to an example embodiment, alternatively or additionally to the first separating clutch, a second separating clutch for switchable separation of a torque transmission between the output shaft and the combustion power section is arranged on the output side between the belt transmission and the output transmission.

This second separating clutch, which is provided alternatively or additionally to the first separating clutch according to the above description, is then connected downstream of the belt transmission on the output side. In this embodiment, the entire combustion power section can be decoupled from the output so that the shafts do not run there when the output shaft rotates or a battery can be charged (with a desired generator speed) while the output shaft is stationary or rotates at an unfavorable or too rapidly varying speed.

In one embodiment, the output side of the belt transmission, e.g., directly the transmission output shaft, is provided with a (combustion-) output gear for outputting the torque of the combustion power section via a (combustion) receiving gear on the receiving shaft of the output transmission, which is mounted on the output shaft of the belt transmission so that it can rotate relative thereto (floating gear). A switchable torque transmission unit is provided fixed to the output shaft, for example an axially displaceable claw (form-fittingly engaging in the combustion-delivery gear). The torque transmission unit is configured in a closed position for axially form-fitting and/or frictional engagement in the combustion-delivery gear, so that a torque of the output shaft can be transmitted to the combustion-delivery gear. In an open position of the torque transmission unit, torque transmission between the output shaft and the combustion-delivery gear is prevented. This device thus forms the second separating clutch.

The speed of the generator can be freely adjusted and the speed of the combustion shaft of the internal combustion engine can be adjusted relatively precisely, at least after starting. As a result, the relative speed of the combustion power section to the output can be regulated to zero, or at least brought close enough to zero so that such a separating clutch can be switched in (almost) any state. Here, too, a separating clutch can be designed as a claw clutch or wedge clutch.

In an alternative or additional embodiment, the hybrid powertrain is provided with a single separating clutch with three switching states on the input side of the belt transmission.

According to the embodiment shown here, the separating clutch is interposed between the belt transmission and the internal combustion engine or between the belt transmission the generator. The separating clutch may be connected directly, i.e., without further transmission elements, to the input side of the belt transmission.

According to this embodiment, the separating clutch as a separating system includes a multiplicity of partial separating clutches so that three switching states can be represented. According to this embodiment, the separating clutch, or the separating system, is only arranged at a single location in the torque transmission train, e.g., as a structural unit. For example, the separating system for the partial separating clutches has a common actuating device and/or a coaxial hollow shaft guide.

For example, in a (first) switching state, the generator shaft, for example designed as a hollow shaft, is torque-transmittingly connected to the (second) input side of the belt transmission and the combustion shaft, for example designed as a through shaft through the hollow shaft, is separated from the (first) input side of the belt transmission. For example, in a (second) switching state, the generator shaft is torque-transmittingly connected to the (second) input side of the belt transmission and the combustion shaft is torque-transmittingly connected to the (first) input side of the belt transmission. For example, in a (third) switching state, the generator shaft and the combustion shaft are torque-transmittingly connected together, wherein the generator shaft and the combustion shaft are then separated from the respective input sides.

An embodiment of the hybrid powertrain is proposed, in which the output-side movable pulley of the belt transmission can be actuated by means of a tandem cylinder, and the combustion-side movable pulley can be actuated by means of a single cylinder.

According to this embodiment, the belt transmission includes a tandem cylinder, and a single cylinder, for example. The cylinders are each configured to actuate an assigned movable pulley, i.e., to move axially as a result of a volume change in the corresponding cylinder. A tandem cylinder has the advantage that over a smaller radial expansion with the same pressure load on the movable pulley or the pressure piston of the movable pulley, an equal or increased axial force can be transmitted to the movable pulley. A tandem cylinder has two pressure cylinders and pressure pistons connected axially one behind the other and functionally in series. One of the pressure pistons may be integrated into the movable pulley.

As a result of the use of a tandem cylinder instead of a radially larger single cylinder on the output-side cone pulley pair, radial installation space is gained, while previously unused axial installation space is used for the additional axial installation length of the tandem cylinder compared to a single cylinder. As a result, an output shaft running in an axial overlap can be brought closer to the belt transmission, which is proposed here. The electric machine can thus also be placed closer to the belt transmission, so that it is a more compact hybrid powertrain.

An embodiment of the hybrid powertrain is proposed in which the generator shaft is torque-transmittingly connected to the combustion-side cone pulley pair by means of a rigid generator transmission, and the rigid generator transmission has a first generator gear on the generator shaft. The first generator gear is rotatably supported on both sides of the first generator gear by means of an axial generator-side support bearing and an axial outer support bearing, and the axial outer support bearing is held by means of a bearing bracket.

According to this embodiment, the hybrid powertrain has a rigid generator transmission with a first generator gear and a second generator gear. The first generator gear is torque-transmittingly fixed coaxially to, e.g., directly on, the generator shaft. The first generator gear is rotatably supported on both sides by means of a first support bearing and a second support bearing. The support bearings are, for example, designed as roller bearings and/or fixed bearings and as floating bearings. The support bearing to the left of the first generator gear in the direction mentioned above is here designated as the axial generator-side support bearing and the support bearing to the right of the first generator gear is designated as the axial outer support bearing.

The axial outer support bearing is held by means of a bearing bracket. The bearing bracket is a component, for example designed as a housing or as a housing component, which determines the axial distance to the other (axial generator-side) support bearing and/or bridged to the generator or the (remaining) generator housing. Thus, the first generator gear is not free on the outside like a cantilever beam, but is instead supported against cantilever bending by the bearing bracket. This improves the support coverage for the second generator gear. The second generator gear may be supported axially on both sides in the same or a similar manner.

In an example embodiment, the bearing bracket is designed as a separate component from the generator and is fastened to a housing component of the combustion power section.

In this embodiment, the bearing bracket is designed as a separate component which is mounted separately. In an example embodiment, the bearing bracket is designed as a housing component such that at least the first generator gear is housed in a sealed manner. Alternatively, the bearing bracket is housed in a housing, for example in a housing tunnel between an upper machine housing and a lower machine housing, and thus only fulfills the task of mechanical support without housing and without sealing. The fact that the bearing bracket is designed as a component that is separate from the generator is understood here as a component that is separate from a generator housing, if there is one.

In one embodiment, no separate and/or housing and sealing generator housing is provided. However, an abutment structure is then provided for holding the armature of the generator. The bearing bracket is then formed separately from this abutment structure. The bearing bracket therefore does not form a (conventional) component of a generator that can be used in the combustion power section. Nevertheless, according to one embodiment, the bearing bracket is already preassembled when the generator is installed in the combustion power section.

An embodiment of the hybrid powertrain is proposed, in which the output-side cone pulley pair is rotatably supported on the generator shaft side by means of a pilot bearing.

The pilot bearing is provided in addition to a fixed bearing-floating bearing arrangement or forms a bearing of such a fixed bearing-floating bearing arrangement, e.g., the floating bearing. The pilot bearing ensures a rotatable support of the transmission shaft on the output side, i.e., the gear output shaft, of the belt transmission on the side facing the generator.

A (combustion) delivery gear may be arranged directly on the transmission output shaft, which is configured to transmit torque to the (combustion) receiving gear of the output transmission for the combustion power section, that meshes with this combustion receiving gear, for example. For a desirable wear pattern, the combustion delivery gear is arranged close to the pilot bearing, because then an evasive deformation and thus an evasive movement of the combustion delivery gear is reduced or prevented. The wear pattern is the tooth overlap present for the power transmission when there is an applied (for example maximum) torque, from which a transverse load is induced in the shaft due to the tooth shape, which results in a bending of the shaft. With a slight deflection of the shaft, a good wear pattern and consequently a gentle load on the teeth of the gearwheel is achieved.

In one embodiment, the pilot bearing is supported on a pin, and the pin extends parallel to and in an axial overlap with an electric receiving gear of the output transmission.

Here, the pilot bearing is also configured to facilitate assembly, in which the transmission output shaft of the belt transmission can be guided onto the pin or, conversely, the pin can be inserted into the already installed transmission output shaft.

In one embodiment, the pin is arranged on a first disk which is connected to a second disk, and a first rotary bearing of the output transmission and/or a third rotary bearing of the output shaft is received by the second disk.

The rotary bearings are arranged coaxially to one another and assigned to the output. The first rotary bearing and the second rotary bearing form a bearing for a component of the output transmission. The third rotary bearing and the fourth rotary bearing form a bearing for the receiving shaft of the output transmission, which is designed, for example, as a hollow shaft through which one of the output shafts is passed and is mounted separately from the bearing of the receiving shaft.

In this embodiment, the pin is a component of a first disk, e.g., formed in one piece therewith. This first disk is fixed to a second disk or the second disk is fixed to the first disk. The second disk is a support structure of the output transmission, e.g., also a housing cover, in one embodiment a sealing housing cover, of the output transmission. This support structure accommodates at least one bearing of a bearing of the output transmission. In one embodiment, this support structure additionally or alternatively accommodates the third rotary bearing of the output shaft. In one embodiment, the first disk and the second disk are formed in one piece.

An embodiment of the hybrid powertrain is proposed, in which the output transmission includes a reduction stage designed as a planetary roller gear. The planetary roller gear includes a ring gear as a rigid torque abutment, a planetary carrier torque-transmittingly connected to the at least one output shaft, and a motor-side sun gear. The sun gear forms the torque input on the motor side and is arranged on a hollow shaft surrounding the output shaft.

The fact that the sun gear is arranged on the motor side here means that both the combustion power section and the electric power section, are, possibly separably, torque-transmittingly connected to the sun gear.

A reduction transmission is provided for the output, both for the electric power section and for the combustion power section, by means of which combustion-side speeds (for example halved engine speed after reduction with rigid and/or variable pilot gear) in the range from above 250 rpm [two hundred and fifty revolutions per minute] to 3,500 rpm [three thousand five hundred revolutions per minute] or more should be reduced to the required rotational speeds of drive wheels, for example tires, of approximately 70 rpm (corresponds to approximately 10 km/h [ten kilometers per hour] for a tire with a diameter of approximately 75 cm [seventy-five centimeters]) to about 1,500 rpm (equivalent to about 200 km/h).

In known hybrid powertrains, separate double reduction stages are usually provided in the torque flow from the combustion power section and the electric power section to the output transmission, for example including a differential. These redundant reduction stages can now be omitted because they are combined in a planetary roller gear and a single upstream spur gear stage. As a result, a reduction stage can be omitted in each of the internal combustion engine and electromotive branch. This results in fewer shafts and bearings, which results in improved efficiency. Furthermore, an additional intermediate gear can be arranged for a more flexible connection of the electric machine and for optimal dimensioning of all spur gear stages. The planetary roller gear used is connected upstream of a differential (e.g., a spur gear differential) and can be integrated therein.

In one embodiment, the output transmission has a receiving shaft and a coaxial reduction stage, designed as one or a plurality of planetary roller stages, for example. The coaxial reduction stage is thus a structural component of the output transmission, and such an output transmission can be manufactured as a structural unit and can be preassembled without the need for disassembly before installation in an application.

In one embodiment, a further (coaxial) reduction stage is provided which forms an intermediate receptacle for the electric power section, and the electric machine of which is referred to as high-speed, for example a speed of up to 18,000 rpm [eighteen thousand revolutions per minute] or even 25,000 rpm. This is advantageous for a high torque or, for example, a smaller radial expansion of the electric machine, i.e., a high power density.

In each of the above-mentioned embodiments, the electric power section therefore has no reduction transmission of its own or no off-axis reduction transmission. This saves radial and/or axial installation space at least on the electric side. Shafts and bearings are also eliminated, which improves efficiency.

The use of the integrated planetary roller gear and the associated dismantling of the redundant structures result in advantages in terms of installation space and further integration of the individual gear elements in the overall drive.

In one embodiment, a first (left) output shaft and a second (right) output shaft are provided, for example in a motor vehicle, which are designed separately from one another and are speed-coupled together by a differential, for example for automatic speed adaptation of the output shafts when cornering.

In a spur gear differential and a planetary roller gear according to the embodiment mentioned above, which is arranged in a torque-transmitting linkage with the one or a plurality of planetary roller gears, one (for example the right) of the output shafts is passed through the sun gear, and the ring gear of the spur gear differential is driven by the planetary carrier. In one embodiment, such a spur gear differential is interposed between a plurality of reduction stages.

In an alternative embodiment, a planetary roller gear is provided in which the sun gear or the planetary carrier forms the rigid abutment. Alternatively, a torque-transmitting linkage of a plurality of planetary roller gears is provided, and only one of the roller gears of one of the planetary roller gears forms the rigid abutment.

In one embodiment, the planetary carrier is supported on both sides by means of at least one rotary bearing and the sun gear is supported by means of a further rotary bearing. One of the rotary bearings of the planetary carrier and the further rotary bearing of the sun gear are arranged axially overlapping one another.

The planetary carrier is mounted on both sides, i.e., supported axially on both sides of the planetary carrier so as to be rotatable, for example by means of an adjusted mounting, for example in an X arrangement. Because the rotary bearing of the sun gear and the rotary bearing of the planetary carrier are arranged close to one another, a good wear pattern is created. In addition, an axial overlap due to the radial expansion of the planetary carrier and the sun gear is not critical. In an advantageous embodiment, the (coaxial) rotary bearings mentioned are held in a common housing part, e.g., in the second disk as described above.

An embodiment of the hybrid powertrain is proposed, in which the hybrid powertrain includes a five-part housing, namely an upper machine housing, a damper housing, a primary state housing, a lower machine housing, and a generator-transmission-housing. The upper machine housing accommodates the bearing for the combustion shaft and has a combustion connection. The damper housing is connected to the combustion connection of the upper machine housing, and accommodates a torsional vibration damper connected to the combustion shaft, the rigid combustion transmission, and the input sides of the combustion-side cone pulley pair. The primary stage housing which axially closes off the damper housing, the lower machine housing accommodates the output-side cone pulley pair, and the generator-transmission-housing accommodates the output transmission, as well as the bearing of the first generator gear. The combustion transmission is often referred to as the primary stage, regardless of the specific embodiment.

The upper machine housing and the lower machine housing are components of an internal combustion engine, for example a conventional one, and only have additional receptacles for the necessary bearings. These receptacles are formed in one piece with the respective machine housing or are attached afterwards, for example cast, welded or screwed. In an example embodiment, the upper machine housing and the lower machine housing are already assembled with one another before further components of the combustion power section are assembled. For a more detailed explanation, reference is made to the description below. In one embodiment, the upper machine housing includes a bearing receptacle for a bearing of the combustion-side cone pulley pair.

In one embodiment, the generator transmission housing accommodates the generator. Alternatively, the generator is flanged to the generator transmission housing with a separate housing.

The five-part housing includes the above-mentioned individual housings formed separately. The housing may be connected together by means of screwing. The five-part housing may form a common housed chamber which is sealed off from the environment and not sealed off from one another or against one another. However, the combustion chamber and the sump or crank chamber of the internal combustion engine are sealed off from the remaining part of the combustion power section and the output.

Each or some of the housing components are integrally formed in one embodiment, so that the number of housings and the number of assembly steps is kept low.

In one embodiment, the torsional vibration damper includes a dual-mass flywheel and/or a centrifugal pendulum.

In one embodiment, the damper housing includes a first separating clutch, e.g., directly adjoining the (first) input side of the belt transmission, for example between the input-side combustion gear of the combustion transmission and the combustion-side cone pulley pair.

In one embodiment, the primary stage housing has a through opening for each shaft, through which a respective shaft nut or another axial securing element and/or axial preloading element can be passed. A bearing of one of the shafts of the combustion transmission can be preassembled in the primary stage housing.

In one embodiment, the lower machine housing accommodates at least one of the output shafts, or a bearing of the output shaft. Additionally or alternatively, the lower machine housing accommodates a housing seal, e.g., in a separate cover element, which seals the transmission chamber of the hybrid powertrain, which may be designed as a wet chamber, to the outside, for example to a Cardan joint, e.g., a constant velocity joint.

According to a further aspect, an assembly method for a hybrid powertrain is proposed according to an embodiment according to the above description. The assembly method includes at least the following steps:
- a.1 the internal combustion engine is preassembled in the upper machine housing and in the lower machine housing, and the two machine housings form a housing tunnel;
- a.2 the belt transmission is mounted in the damper housing;
- b. the belt transmission mounted in the damper housing is introduced into the housing tunnel, and the combustion-side cone pulley pair is introduced with a radial offset to a combustion-side transmission axis and then transferred to the end position;
- c.1 a generator shaft-side roller bearing of the output-side cone pulley pair and an output gear are attached to the output side;
- c.2 a second generator gear of the generator transmission of the generator is applied to the input side;
- c.3 the damper housing is connected to the upper machine housing;
- d.1 before or after the generator transmission housing has been connected to the upper machine housing, the generator and the output transmission are mounted in the generator-transmission-housing;
- d.2 the first generator gear of the rigid generator transmission is mounted on the generator shaft;
- d.3 in the lower machine housing, the output shaft is installed with a hollow shaft including a transmission input gear, a combustion receiving gear and an electric receiving gear;
- e. the primary stage housing is connected to the damper housing;
- f. the shaft nuts are guided through the respective through opening of the primary stage housing and are tightened on the shafts of the combustion transmission; and
- g. the through openings of the primary stage housing are sealed off.

The steps with the same letter and different ordinal numbers can be carried out separately from one another at the same time or in any order. Otherwise, the alphabetical order of the steps must be adhered to, unless an alternative order is explicitly indicated. In one embodiment, the steps mentioned represent only an extract of those steps which differ from the previous ones. For example, not all pre-assembly steps and no details of the assembly of the structural units are described, even if the structural units themselves are not part of the prior art.

According to an example embodiment, in step a.1 the torsional vibration damper is already centered and fastened, for example screwed, on the combustion shaft.

According to an example embodiment, in step a.2, a first separating clutch in the damper housing is connected to the first input side of the combustion-side cone pulley pair. Additionally or alternatively, in step a.2 the combustion transmission is mounted in the damper housing.

In step b. the belt transmission mounted in the damper housing is inserted into the housing tunnel. The space available here is usually limited and the shafts of the belt transmission must be threaded in the bearing seats of the (overall) housing, for example in the upper machine housing and/or in the lower machine housing. The bearings on the input side, e.g., the generator shaft-side bearing not mounted in the damper housing, may be already preassembled.

According to an example embodiment, in step c.1 a second separating clutch, for example a wedge clutch, is axially arranged between the generator shaft-side roller bearing of the output-side cone pulley pair and the output gear. The second separating clutch may be arranged axially between a combustion transmission-side bearing of the input side and a belt transmission-side bearing of the combustion transmission, for example in an axial overlap with the torsional vibration damper of the combustion shaft.

In one embodiment, the damper housing may not be connected to the upper machine housing until all components have been introduced into the housing tunnel. However, in one embodiment, step c.3 is to connect the damper housing to the upper machine housing immediately after step b.

In one embodiment, the generator transmission housing in step d.1 may be connected to the upper machine housing before the generator and the output transmission are mounted in the generator transmission housing. Alternatively, the generator and/or the output transmission are preassembled with the generator transmission housing before the generator transmission housing in step d.1 is connected to the upper machine housing. It should be noted that the generator transmission housing in one embodiment having of two part housings, namely a generator housing part and a gear housing part, are already preassembled with one another or are only later assembled with one another, or are only connected together indirectly via a further housing component of the overall housing.

In one embodiment, the bearing bracket is mounted on the generator transmission housing in step d.2 after the first generator gear of the rigid generator transmission has been mounted on the generator shaft. Alternatively, the first generator gear is preassembled in the bearing bracket and then the first generator gear is mounted on the generator transmission housing as a structural unit with the bearing bracket.

In one embodiment, in step d.3, a hollow shaft with only one fixed bearing is mounted in the lower machine housing. A second support is provided by a housing cover of the transmission housing, for example the above-mentioned second disk, which after completion of step d.1 has been connected to the generator transmission housing.

In order to be able to mount the belt transmission in as complete a condition as possible, at least with the belt attached, it is proposed here that the bearing receptacle for the generator shaft-side roller bearing of the combustion-side cone pulley pair has a diameter which allows a radial offset of the cone pulley pair on the combustion side with respect to the combustion-side transmission axis to a necessary extent. For example, due to the outer contour of the upper machine housing, the combustion-side cone pulley pair cannot be introduced purely axially, but must first be radially offset, or at least over an axial section. The transmission axis is the axis of rotation of the combustion-side cone pulley pair in the operational end state of the combustion power section.

In one embodiment, said bearing receptacle is axially short so that the generator-side roller bearing of the combustion-side cone pulley pair can already be preassembled and does not axially overlap, i.e., not collide, with said mentioned bearing receptacle in the axial area of the necessary radial offset of the combustion-side cone pulley pair.

Said bearing receptacle may be part of the upper machine housing which, together with the lower machine housing, forms a housing tunnel which houses at least the belt transmission. The generator transmission housing closes this housing on the generator side (on the left in the above viewing direction) and the damper housing or ultimately the primary-stage housing closes this housing on the opposite side (on the right in the above viewing direction).

The assembly method shown here allows a manageable design with low susceptibility to errors and at the same time a compact structure of the combustion power section and thus the overall hybrid powertrain.

BRIEF DESCRIPTION OF THE DRAWINGS

The above disclosure is explained in detail below based on the relevant technical background with reference to the associated drawings, which show example embodiments. The disclosure is in no way restricted by the purely schematic drawings, while it should be noted that the drawings are not dimensionally accurate and are not suitable for defining proportions. In the figures.

DETAILED DESCRIPTION

Figure 1:
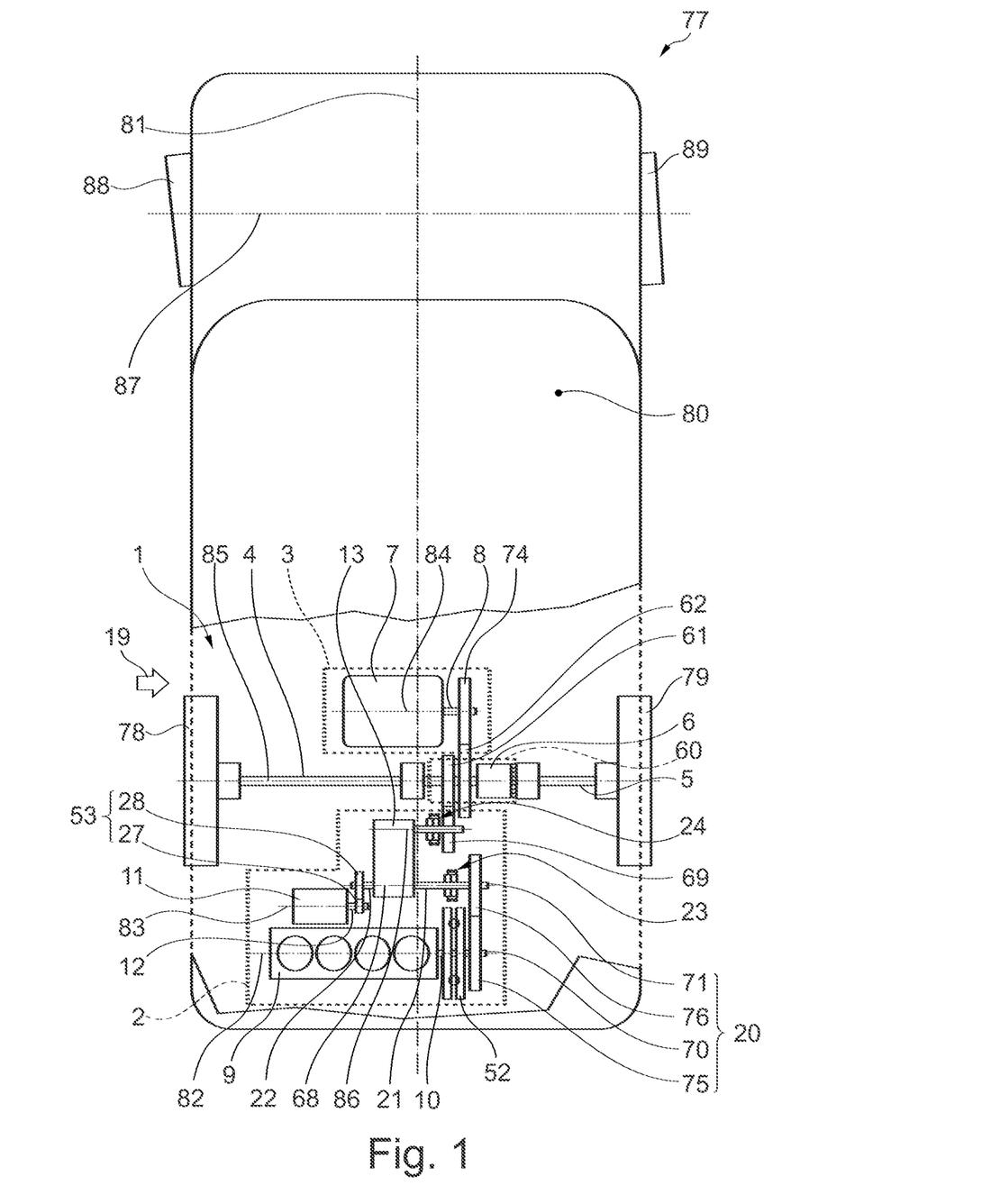
FIG. 1 shows a hybrid powertrain in a motor vehicle.
Figure 2:
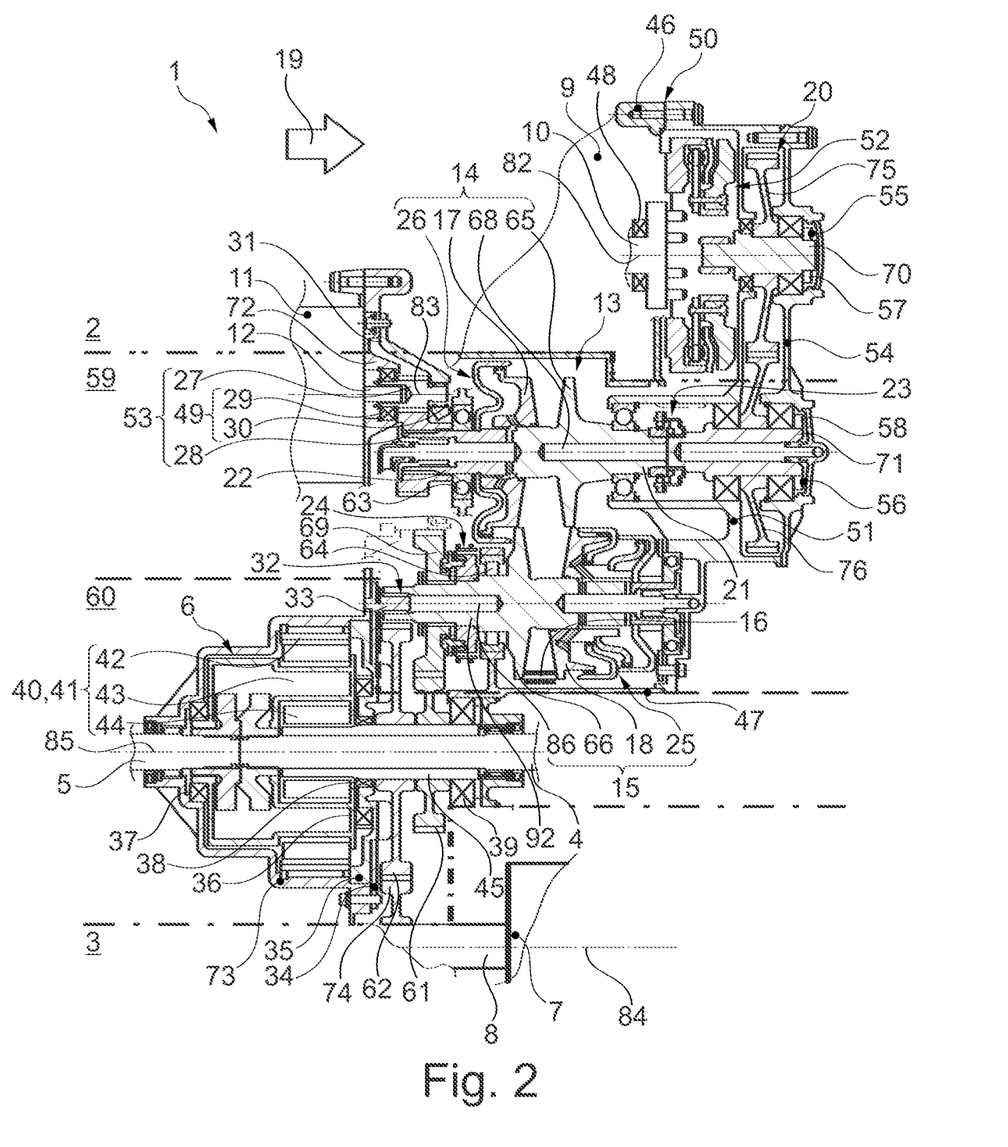
FIG. 2 shows a hybrid powertrain in section.

In FIG. 1, a motor vehicle 77 is shown schematically from above. The structure of a hybrid powertrain 1 with a combustion power section 2, an electric power section 3 and an output 60 can be seen in a cutout at the rear of the vehicle. The hybrid powertrain 1 shown only shows the functional interconnection of the components of the hybrid powertrain 1 and does not provide any information about the actual structural nesting of the components. An example embodiment of a possible constructive nesting of the components of the hybrid powertrain 1 is shown in FIG. 2 and in this respect reference is made to the description there.

The output 60 is configured to transmit torque about an output axis 85 to a left drive wheel 78 by means of a left output shaft 4 and a right drive wheel 79 by means of a right output shaft 5. The designation left and right is chosen here for the usual direction of travel of a motor vehicle 77. Here, the driver's cab 80 is arranged in front of the hybrid powertrain 1 with respect to the longitudinal axis 81, and a left front wheel 88 and a right front wheel 89 are arranged in front of the driver's cab 80 on a front axle 87. The left output shaft 4 and the right output shaft 5 are torque-transmittingly connected by means of an output transmission 6 to a rotor shaft 8 of an electric machine 7, for example the main traction drive machine, and by means of a combustion-output gear 69 to an internal combustion engine 9 and to a generator 11. For example, the output transmission 6 includes a differential, so that a torque or a speed can be distributed to the left output shaft 4 and the right output shaft 5 depending on the current requirements of the left drive wheel 78 and the right drive wheel 79.

The electric power section 3 is not explained in more detail here. It includes an electric machine 7, which can output and/or absorb a torque about the electric axis 84 via its rotor shaft 8. The torque is transmitted to the output 60 via an electric transmission, which, in the embodiment shown, only includes an electric output gear 74 in the form of a spur gear, by means of an electric receiving gear 62, or vice versa. The electric energy source or the electric energy store is not shown here, but, for example, a lithium battery and/or an inverter with a direct electrical connection to the generator 11 of the combustion power section 2 is provided.

The combustion power section 2 includes an internal combustion engine 9 with a combustion shaft 10, by means of which a torque can be output and received about a combustion axis 82. Furthermore, a generator 11 includes a generator shaft 12, by means of which a torque about a generator axis 83 can be output and received. Both the internal combustion engine 9, by means of a first input side 21, and the generator 11 are torque-transmittingly connected to a belt transmission 13 by means of a second input side 22 about a common input-side transmission axis 68. The torque absorbed by the belt transmission 13 is transmitted to a combustion output gear 69 on a combustion receiving gear 61 of the output 60 via the output-side transmission axis 86 of the belt transmission 13, and conversely, a torque of the output 60 is transmitted to the belt transmission 13 via this. Here, the combustion receiving gear 61 and the electric receiving gear 62 of the output are (optionally) designed separately.

A torque transmission from the combustion power section 2 to the output 60 can be interrupted by means of a (second) separating clutch 24 so that, for example, the internal combustion engine 9 can be operated in torque-transmitting connection to the generator 11 for charging an energy store (not shown) regardless of a driving speed and regardless of a torque requirement at any desired, e.g., performance-optimized, speed. In addition, the (second) separating clutch 24 is arranged so close to the output 60 that only the combustion output gear 69 of the combustion power section 2 rotates at one speed on the combustion-receiving gear 61 of the output 60 as an inertial mass. The efficiency for purely electric driving with the electric power section 3 as the only drive is high as a result.

A (first) separating clutch 23 is also provided internally in the combustion power section 2, which can be switched to interrupt the first input side 21 of the belt transmission 13 from a torque transmission between the belt transmission 13 and the internal combustion engine 9. Thus, for example, purely electric driving with the (large) electric machine 7 of the electric power section 3 and additionally the (motor) generator 11 of the combustion powertrain 2 is possible. The internal combustion engine 9 can then idle.

The internal combustion engine 9 here (optionally) has a torsional vibration damper 52 in an axial extension of its combustion axis 82. The (torsional vibration decoupled extension of the) combustion shaft 10 is torque-transmittingly connected to the first (combustion-side) input side 21 of the belt transmission 13 via a combustion transmission 20 (here optionally designed as a single-stage spur gear). The combustion transmission 20 shown here includes a first (combustion-side) combustion spur gear 75 and a second (transmission-side) combustion spur gear 76.

The generator 11 here (optionally) has a first generator gear 27 of a generator transmission 53 (optionally designed here as a single-stage spur gear) in the axial extension of its generator axis 83, which is connected via a second generator gear 28 to the second (generator-side) input side 21 of the belt transmission 13 to transmit torque. The generator 11 and the internal combustion engine 9 are arranged here in such a way that their shafts 10, 12 point in the same axial direction 19.

In FIG. 2, a hybrid powertrain 1 is shown in the same configuration as shown in FIG. 1, with structural details and the nesting of the components being shown in a planar sectional view. For the functional relationship, reference is therefore made to the preceding description. The hybrid powertrain 1 is divided into the combustion power section 2, which includes a housing tunnel 59, the electric power section 3, and the output 60, which are each delimited from one another by a dashed line. The housing tunnel 59 is formed within the combustion power section 2 for receiving the belt transmission 13 and is delimited with the dashed line from the output 60 and with a dashed double dotted line from the remainder of the combustion power section 2.

The belt transmission 13 includes a combustion-side cone pulley pair 14 and an output-side cone pulley pair 15, which are torque-transmittingly connected together by means of a belt 16 with continuously variable transmission. The belt 16, of which a cradle thrust piece of a cradle thrust piece chain is shown here pars pro toto only in the case of the output-side cone pulley pair 15, is clamped between the combustion-side movable pulley 17 and a corresponding (axially) rigid combustion-side conical pulley 65 on an active circuit, and is also clamped between an output-side movable pulley 18 and a corresponding (axially) rigid output-side conical pulley 66. The torque is transmitted via the clamping of the belt 16. The cone pulley pairs 14, 15 are below the respective gear shaft 68, 86 in overdrive, so with the maximum gear ratio of the internal combustion engine 9 toward the output 60 and above the respective transmission axis 68, 86 in underdrive, i.e., with the maximum reduction ratio of the internal combustion engine 9 through to the output 60, so that the two extreme positions of the movable pulleys 17, 18 are shown in the illustration. Of course, this does not correspond to a real situation.

The combustion-side movable pulley 17 is (directly) actuated here by means of a single cylinder 26. The output-side movable pulley 18 is (directly) actuated here by means of a tandem cylinder 25. As a result, radial installation space is gained on the output side, so that the combustion power section 2 can be moved radially closer to the second output shaft 5 overall. The gain in installation space is clear compared to the wall profile of the upper machine housing 46 in the case of the single cylinder 26, which has a bend radially outward (here in the illustration upwards towards the internal combustion engine 9) so that the single cylinder 26 with its radially significantly larger dimensions can be accommodated as the combustion-side movable pulley 17. For the assembly of the belt transmission 13, reference is made to the following description with respect to FIG. 3 which shows a section of the combustion power section 2 according to FIG. 2.

The generator 11 is accommodated by a generator housing part 72, here flanged thereto. The output transmission 6 is accommodated in a transmission housing part 73. The generator housing part 72 and the transmission housing part 73 form the transmission generator housing, which is (optionally) formed in one piece here. In the illustration above the housing tunnel 59, a section of the upper machine housing 46 can be seen, which accommodates the combustion bearing 48 for the combustion shaft 10 and has a combustion connection 50 for flanging a damper housing 51. The damper housing 51 accommodates the torsional vibration damper 52 as an axial extension of the combustion axis 82 and, offset parallel thereto around the combustion-side transmission axis 68 of the belt transmission 13 (here optionally designed as a fixed bearing), another roller bearing (not designated here) for the first (here designed as a direct input shaft) input side 21 of the belt transmission 13. Furthermore, the damper housing 51 here (optionally) accommodates a first separating clutch 23 (here optionally designed as a wedge clutch). The damper housing 51 here (optionally) furthermore has an axial wall section which extends beyond a bearing receiving wall which accommodates the combustion transmission 20 and there forms a connection for the primary-stage housing 54. This can also be carried out in reverse, for example, so that the axial wall section is formed by the primary-stage housing 54.

The internal combustion transmission 20 is designed here as a single stage and the first transmission in the internal combustion engine 9 and is therefore often referred to as the primary stage, from which the name for the relevant housing component 54 results. The combustion transmission 20 includes the first (combustion-side) combustion gear 75 and the second (generator-side) combustion gear 76. The first combustion gear 75 is arranged in the axial extension of the combustion shaft 10 and forms the axially last torque-transmitting component in the extension of the combustion shaft 10. The second combustion gear 76 is arranged in alignment with the combustion-side transmission axis 68 of the belt transmission 13 and here (optionally) can be separated by means of the first separating clutch 23, so that if the torque transmission is interrupted by means of the first separating clutch 23, the entire combustion transmission 20 is not dragged along.

The first combustion gear 75 is arranged on a first shaft 70 of the combustion transmission 20, the bearing of which (not designated individually here, but recognizable as a fixed-floating bearing) can be clamped by means of a first shaft nut 57, and the first shaft nut 57 can be passed through a first through opening 55 in the primary-stage housing 54. The second combustion gear 76 is arranged on a second shaft 71 of the combustion transmission 20, the bearing of which (not designated individually here, but recognizable as a fixed-floating bearing) can be clamped by means of a second shaft nut 58, and the second shaft nut 58 can be passed through a second through opening 56 in the primary-stage housing 54. Here, the first through opening 55 and the second through opening 56 are closed by means of respective covers.

The generator shaft 12 is directly connected to a first (generator-side) generator gear 27 of a generator transmission 53. The first generator gear 27 is supported on both sides by means of a generator gear bearing 49, namely, as shown, on the left by an axial generator-side support bearing 29, here designed as a fixed bearing, and on the right by an axial outer support bearing 30, here designed as a floating bearing. The axial outer support bearing 30 is held by a bearing bracket 31, which is connected, here screwed, to the generator housing part 72 of the generator 11. This results in a slight bending deformation of the shaft carrying the first generator gear 27 (not designated here), which here represents an axial extension of the generator shaft 12. This results in a good wear pattern to the corresponding second generator gear 28, which is connected here in an axial extension or even in one piece with the (second) input side 22 designed as a (second) input shaft.

The (output-side) output side 92 of the belt transmission 13, which is designed here as an output shaft, is supported on the left end side of the illustration by means of an additional pilot bearing 32 on a pin 33, here in addition to a fixed-floating bearing (not designated) of the output side 92. Said fixed-floating bearing of the output side 92 includes an output-side roller bearing 64, here (optionally) designed as a floating bearing with cylindrical rollers, which is held axially on the side facing the generator 11, i.e., on the generator shaft side, in a lower machine housing 47. The lower machine housing 47 and the upper machine housing 46 form the housing tunnel 59, and thus leave a space free.

These two housing components 46, 47 may be already connected together before the belt transmission 13 is introduced into the housing tunnel 59; and the lower machine housing 47 and the upper machine housing 46 may form components of a ready-to-operate, prefabricated internal combustion engine 9.

A second separating clutch 24 is arranged between the output-side roller bearing 64 of the belt transmission 13 and the combustion output gear 69, which here is configured (optionally) for form-fitting engagement in the combustion output gear 69 rotatably mounted on the output side 92 of the belt transmission 13.

The pin 33 of the pilot bearing 32 is, here (optionally) in one piece, connected to a first disk 34. The first disk 34 is in turn connected to a second disk 35, wherein the second disk 35 closes off the transmission housing part 73. The second disk 35 here (optionally) has the task of receiving a first rotary bearing 36 and a third rotary bearing 38. The first rotary bearing 36 supports a planetary carrier 43 and the third rotary bearing 38 supports a transmission input shaft of the output transmission 6 which is configured here as a hollow shaft 45. The second disk 35 is axially positively and/or non-positively held between the transmission housing part 73 and the first disk 34.

The output transmission 6 is not shown in detail here. It includes a differential (not designated) for the left output shaft 4 and the right output shaft 5 (the view is rotated or mirrored in this illustration compared to the illustration in FIG. 1) and a reduction stage 40, which is designed as a planetary roller gear 41. The planetary roller gear 41 includes a ring gear 42 forming the rigid abutment, which is torque-supported on the transmission housing part 73, a planetary carrier 43 with planetary gears (not designated), and a sun gear 44, which is connected to the hollow shaft 45 forming the transmission input shaft of the output transmission 6. The planetary roller gear 41, as well as the differential here, is supported on both sides inside the transmission housing part 73, namely (on the right according to the illustration) by means of the first rotary bearing 36 and (on the left according to the illustration) by means of the second rotary bearing 37. The hollow shaft 45 with the sun gear 44 is supported in an axial overlap with the first rotary bearing 36 by means of the third rotary bearing 38, here (optionally) a floating bearing, in the transmission housing part 73 and supported on the lower machine housing 47 by means of a fourth rotary bearing 39, here (optionally) a fixed bearing.

Figure 3:
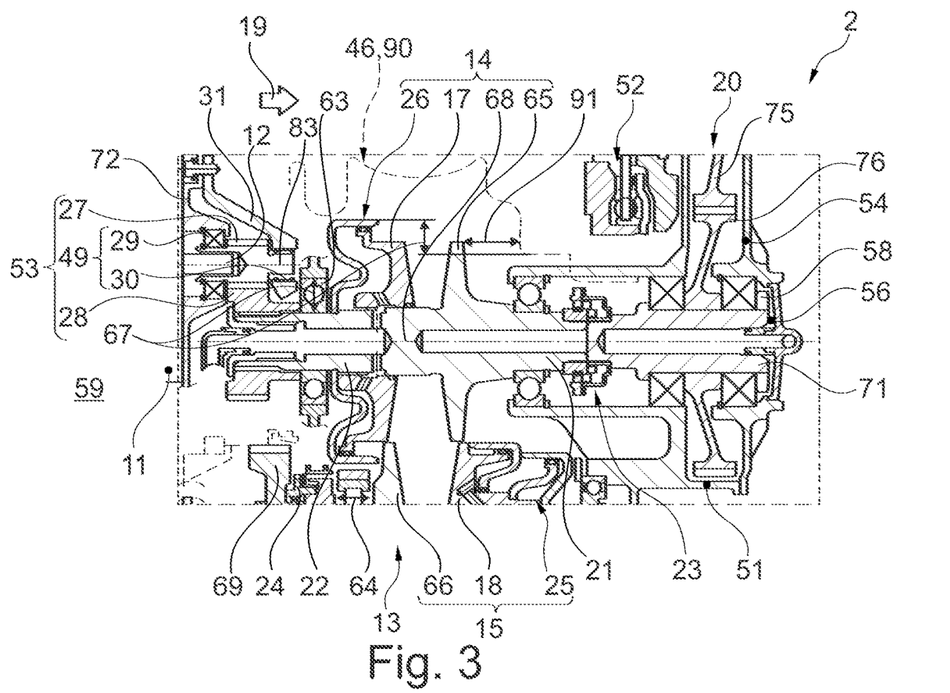
FIG. 3 shows a section of the combustion power section according to FIG. 2.

FIG. 3 shows a section of the combustion power section 2 as shown in FIG. 2. In this respect, reference is made to the previous description. Here, it can be seen that the housing tunnel 59 is limited in the illustration above by an interference contour 90. It follows from this that the combustion-side cone pulley pair 14 must be introduced via an axial offset 91 during assembly at least with a radial offset 67. The bearing receptacle (not designated here) for the roller bearing 63 on the generator shaft side of the belt transmission 13 must be threaded into the generator shaft end of the (second) output side 22 in the area of the axial offset 91 during assembly. Therefore, the difference between said bearing receptacle and the (second) input shaft must at least correspond to the radial offset 67, i.e., it must not be smaller.

Figure 4:
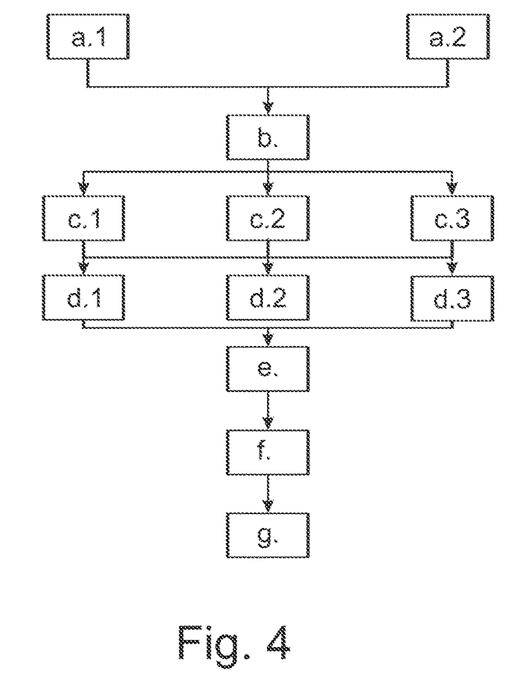
FIG. 4 shows a flow diagram of an assembly method.

FIG. 4 shows a flow diagram of the assembly method for such a hybrid powertrain 1. In this respect, reference is made to the description. It should be noted that step d.2 can be carried out following step b. or following step c. and before, simultaneously with, or after step d.1. Steps a.1 to a.4 can also be carried out one after the other or at the same time. Incidentally, the steps must be completed line by line, i.e., alphabetically, before a step in the next line can be carried out. The assembly method contains further details which are not shown or explained here, which either correspond to the prior art or can be added by the person skilled in the art.

Here, a hybrid powertrain is proposed in a compact and easily installed configuration that can be introduced into a motor vehicle.

REFERENCE NUMERALS

1 Hybrid powertrain
2 Combustion power section
3 Electric power section
4 Left output shaft
5 Right output shaft
6 Output transmission
7 Electric machine
8 Rotor shaft
9 Internal combustion engine
10 Combustion shaft
11 Generator
12 Generator shaft
13 Belt transmission
14 Combustion-side cone pulley pair
15 Output-side cone pulley pair
16 Belt
17 Combustion-side movable pulley
18 Output-side movable pulley
19 Axial direction
20 Combustion transmission
21 First input side
22 Second input side
23 First separating clutch
24 Second separating clutch
25 Tandem cylinder
26 Single cylinder
27 First generator gear
28 Second generator gear
29 Axial generator-side support bearing
30 Axial outer support bearing
31 Bearing bracket
32 Pilot bearing
33 Pin
34 First disk
35 Second disk
36 First rotary bearing
37 Second rotary bearing
38 Third rotary bearing
39 Fourth rotary bearing
40 Reduction stage
41 Planetary roller gear
42 Ring gear
43 Planetary carrier
44 Sun gear
45 Hollow shaft
46 Upper machine housing
47 Lower machine housing
48 Combustion bearing
49 Generator gear bearing
50 Combustion connection
51 Damper housing
52 Torsional vibration damper
53 Generator transmission
54 Primary stage housing
55 First through opening
56 Second through opening 57 First shaft nut
58 Second shaft nut
59 Housing tunnel
60 Output
61 Combustion receiving gear
62 Electric receiving gear
63 Combustion-side roller bearing (on the generator shaft side)
64 Output-side roller bearing (on the generator shaft side)
65 Combustion-side rigid conical pulley
66 Output-side rigid conical pulley
67 Radial offset
68 Input-side transmission axis of the belt transmission
69 Combustion output gear
70 First shaft of the combustion transmission
71 Second shaft of the combustion transmission
72 Generator housing part
73 Transmission housing part
74 Electric output gear
75 First combustion spur gear
76 Second combustion spur gear
77 Motor vehicle
78 Left drive wheel
79 Right drive wheel
80 Driver's cab
81 Longitudinal axis
82 Combustion axis
83 Generator axis
84 Electric axis
85 Output axis
86 Output-side transmission axis of the belt transmission
87 Front axle
88 Left front wheel
89 Right front wheel
90 Interference contour
91 Axial offset
92 Output side

The invention claimed is:

1. A hybrid powertrain comprising:
an output shaft;
a combustion power section for providing a first torque to the output shaft, comprising:
an internal combustion engine comprising a combustion shaft for outputting the first torque;
a generator comprising a generator shaft for converting the first torque into electric energy; and
a variable belt transmission for variably translating the first torque, comprising:
a combustion-side cone pulley pair comprising a first axially movable pulley, arranged on a generator shaft side, for changing a transmission ratio of the variable belt transmission;
an output-side cone pulley pair comprising a second axially movable pulley, axially opposite the first axially movable pulley, for changing the transmission ratio of the variable belt transmission; and
a belt for variably torque-transmittingly connecting the combustion-side cone pulley pair to the output-side cone pulley pair;
an electric power section for providing a second torque to the output shaft; and
an output transmission torque transmittingly connected to the output shaft for:
transmitting the first torque between the combustion power section and the output shaft; and
transmitting the second torque between the electric power section and the output shaft, wherein:
the output transmission comprises a reduction stage; and
the reduction stage is a planetary roller gear, the planetary roller gear comprising:
a ring gear arranged as a rigid torque abutment;
a planetary carrier torque-transmittingly connected to the output shaft; and
a sun gear arranged as a torque input on a hollow shaft surrounding the output shaft.

2. The hybrid powertrain of claim 1 further comprising a rigid combustion transmission, wherein:
the combustion shaft and the generator shaft extend in a same axial direction;
the combustion shaft is torque-transmittingly connected to a first input side of the combustion-side cone pulley pair by the rigid combustion transmission; and
the generator shaft is torque-transmittingly connected to a second input side of the combustion-side cone pulley pair, axially opposite the first input side.

3. The hybrid powertrain of claim 1 further comprising:
a first separating clutch disposed between the combustion shaft and the variable belt transmission for switchably separating torque transmission between the internal combustion engine and the output shaft; or
a second separating clutch disposed between the variable belt transmission and the output shaft for switchably separating torque transmission between the combustion power section and the output shaft.

4. The hybrid powertrain of claim 1 further comprising:
a single cylinder for actuating the first axially movably pulley; and
a tandem cylinder for actuating the second axially movable pulley.

5. The hybrid powertrain of claim 1 further comprising:
a rigid generator transmission torque-transmittingly connecting the generator shaft to the combustion-side cone pulley pair, the rigid generator transmission comprising a first generator gear arranged on the generator shaft;
a generator-side support bearing for rotatably supporting a first axial side of the first generator gear;
an outer support bearing for rotatably supporting a second axial side of the first generator gear, opposite the first axial side; and
a bearing bracket holding the outer support bearing.

6. The hybrid powertrain of claim 5, wherein:
the bearing bracket is a separate component from the generator; and
the combustion power section further comprises a housing component; and
the bearing bracket is fastened to the housing component.

7. The hybrid powertrain of claim 1 further comprising a pilot bearing for rotatably supporting the output-side cone pulley pair on the generator shaft side.

8. The hybrid powertrain of claim 7 further comprising a pin, wherein:
the pilot bearing is supported on the pin; and
the output transmission comprises an electric receiving gear.

9. The hybrid powertrain of claim 8 further comprising:
a first disk and second disk; wherein:
the pin is arranged on the first disk;
the first disk is connected to the second disk; and
the output transmission comprises a first rotary bearing received by the second disk; or
the output shaft comprises a third rotary bearing received by the second disk.

10. The hybrid powertrain of claim 1, wherein:
the output transmission comprises a first rotary bearing and a second rotary bearing;
the output shaft comprises a third rotary bearing;
the planetary carrier is supported on a first axial side by the first rotary bearing and on a second axial side, opposite the first axial side, by the second rotary bearing;
the sun gear is supported by the third rotary bearing; and
the third rotary bearing axially overlaps a one of the first rotary bearing or the second rotary bearing.

11. The hybrid powertrain of claim 10, wherein the third rotary bearing and the one of the first rotary bearing or the second rotary bearing are held in a common housing part.

12. The hybrid powertrain of claim 1 further comprising:
an upper machine housing comprising a combustion connection;
a combustion shaft bearing installed in the upper machine housing;
a damper housing connected to the combustion connection;
a rigid combustion transmission torque-transmittingly connecting the combustion shaft to a first input side of the combustion-side cone pulley pair;
a torsional vibration damper installed in the damper housing and connected to the combustion shaft, the rigid combustion transmission, and the first input side;
a primary stage housing that axially closes off the damper housing;
a lower machine housing, the output-side cone pulley pair being installed in the lower machine housing;
a rigid generator transmission torque-transmittingly connecting the generator shaft to the combustion-side cone pulley pair, the rigid generator transmission comprising a first generator gear arranged on the generator shaft;
a generator-side support bearing for rotatably supporting a first axial side of the first generator gear; and
a generator transmission housing, the output transmission and the generator-side support bearing being installed in the generator transmission housing.

13. The hybrid powertrain of claim 12 wherein the combustion-side cone pulley pair is installed in the upper machine housing.

14. The hybrid powertrain of claim 12 further comprising a first separating clutch connected to the torsional vibration damper.

15. The hybrid powertrain of claim 12 wherein the primary stage housing comprises a through opening for a shaft nut for the rigid combustion transmission.

16. The hybrid powertrain of claim 12 wherein the output shaft is installed in the lower machine housing.

17. The hybrid powertrain of claim 12 wherein the upper machine housing, the damper housing, the primary stage housing, the lower machine housing, and the generator transmission housing are configured as a single housing.

18. A method for assembling the hybrid powertrain of claim 12, comprising:
preassembling the internal combustion engine to the upper machine housing and in the lower machine housing, the upper machine housing and the lower machine housing forming a housing tunnel;
mounting the variable belt transmission and the rigid combustion transmission in the damper housing, and connecting a first separating clutch to the first input side of the combustion-side cone pulley pair;
introducing the variable belt transmission into the housing tunnel, and introducing the combustion-side cone pulley pair with a radial offset to a combustion-side transmission axis and transferring the combustion-side cone pulley pair to an end position;
mounting a generator shaft-side roller bearing and an output gear on the output-side cone pulley pair, and arranging a second separating clutch axially between the generator shaft-side roller bearing and the output gear;
installing a second generator gear to a second input side of the combustion-side cone pulley pair, axially opposite the first input side;
connecting the damper housing to the upper machine housing;
mounting the generator and the output transmission in the generator transmission housing;
mounting the first generator gear on the generator shaft, and mounting a bearing bracket on the generator transmission housing;
installing the output shaft with a hollow shaft comprising a transmission input gear, a combustion receiving gear and an electric receiving gear;
connecting the primary stage housing to the damper housing;
guiding a first shaft nut and a second shaft nut through respective through openings of the primary stage housing and tightening the first shaft nut and the second shaft nut on respective shafts of the rigid combustion transmission; and
sealing the respective through openings.

19. A hybrid powertrain comprising:
an output shaft;
a combustion power section for providing a first torque to the output shaft, the combustion power section comprising:
an internal combustion engine comprising a combustion shaft for outputting the first torque;
a generator comprising a generator shaft for converting the first torque into electric energy; and
a variable belt transmission for variably translating the first torque, the variable belt transmission comprising:
a combustion-side cone pulley pair comprising a first axially movable pulley, arranged on a generator shaft side, for changing a transmission ratio of the variable belt transmission;
an output-side cone pulley pair comprising a second axially movable pulley, axially opposite the first axially movable pulley, for changing the transmission ratio of the variable belt transmission; and
a belt for variably torque-transmittingly connecting the combustion-side cone pulley pair to the output-side cone pulley pair;
an electric power section for providing a second torque to the output shaft;
an output transmission torque transmittingly connected to the output shaft for:
transmitting the first torque between the combustion power section and the output shaft; and
transmitting the second torque between the electric power section and the output shaft;
an upper machine housing comprising a combustion connection;
a combustion shaft bearing installed in the upper machine housing;
a damper housing connected to the combustion connection;

a rigid combustion transmission torque-transmittingly connecting the combustion shaft to a first input side of the combustion-side cone pulley pair;

a torsional vibration damper installed in the damper housing and connected to the combustion shaft, the rigid combustion transmission, and the first input side;

a primary stage housing that axially closes off the damper housing;

a lower machine housing, the output-side cone pulley pair being installed in the lower machine housing; and a rigid generator transmission torque-transmittingly connecting the generator shaft to the combustion-side cone pulley pair, the rigid generator transmission comprising a first generator gear arranged on the generator shaft;

a generator-side support bearing for rotatably supporting a first axial side of the first generator gear; and a generator transmission housing, wherein:
    the output transmission and the generator-side support bearing are installed in the generator transmission housing; and
    the primary stage housing comprises a through opening for a shaft nut for the rigid combustion transmission.

* * * * *